July 14, 1931.  A. M. NIVEN  1,814,765
SLEEVE VALVE
Original Filed July 15, 1  2 Sheets-Sheet 1

INVENTOR.
Archie Macphail Niven
BY
ATTORNEY.

July 14, 1931.  A. M. NIVEN  1,814,765
SLEEVE VALVE
Original Filed July 15, 1927   2 Sheets-Sheet 2
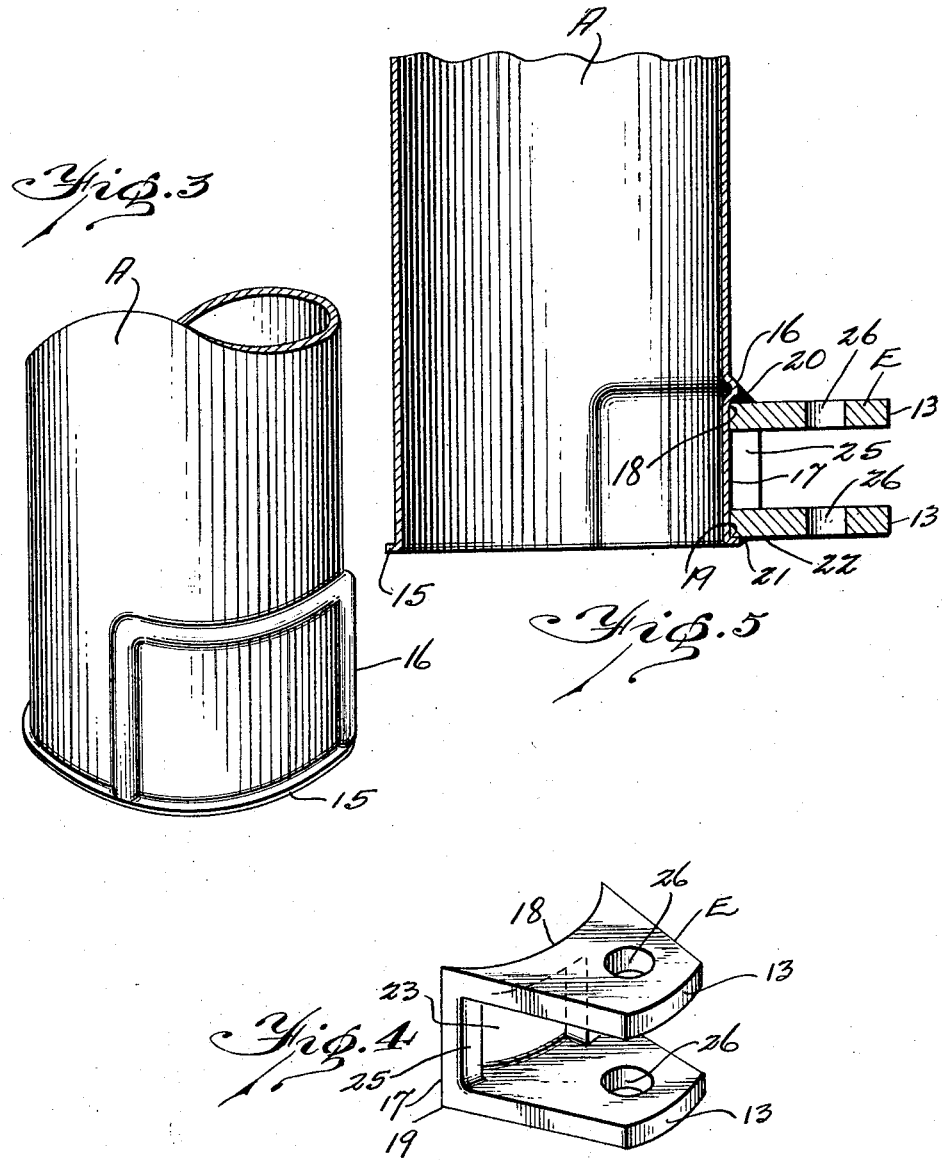
INVENTOR.
Archie Macphail Niven
BY W. W. Harris
ATTORNEY.

Patented July 14, 1931

1,814,765

UNITED STATES PATENT OFFICE

ARCHIE MACPHAIL NIVEN, OF DETROIT, MICHIGAN, ASSIGNOR TO CONTINENTAL MOTORS CORPORATION, OF DETROIT, MICHIGAN, A CORPORATION OF VIRGINIA

SLEEVE VALVE

Original application filed July 15, 1927, Serial No. 205,973. Divided and this application filed August 23, 1928. Serial No. 301,445.

This invention relates to internal combustion engines and refers more particularly to an improved sleeve valve. My invention relates primarily to the single sleeve valve engine and particularly, though not necessarily so limited, to the type where the sleeve is moved in a combined reciprocating and oscillating path with respect to the sleeve and cylinder axis whereby the sleeve and cylinder ports are caused to function in the well known manner.

Heretofore such sleeve valves have been generally made of cast iron, especially where the valves are driven by a link mechanism operated by a valve layshaft. Steel sleeves or sleeves constructed of materials having the general characteristics of steel as distinguished from cast iron have been used in many types of sleeve valve engines and my invention embodies an improved construction for this type of sleeve valve. It is known that steel sleeves may be made much lighter than cast iron sleeves thus reducing the inertia forces incident to operating the engine. Difficulty has been experienced, however, in suitably and conveniently securing the driving lug or other sleeve driving means to the steel sleeve valve. Such a problem does not arise in the use of cast iron sleeves since such lugs or driving means may be cast integrally with the sleeves. A further difficulty experienced in connection with the use of steel sleeves resides in conveniently reinforcing the lower end of the sleeve. The steel sleeve due to its thinness is generally reinforced to prevent undue twisting and distortion. Here, again where such reinforcing is desirable in a cast iron sleeve, a reinforcing annular band or bands may be conveniently cast with the sleeve.

I have provided means whereby a steel sleeve valve may be conveniently and cheaply manufactured, overcoming the difficulties experienced in the past.

This application is a division of my copending application Serial No. 205,973, filed July 17, 1927.

With the foregoing and other objects in view my invention resides in the novel combination and arrangement of parts more particularly hereinafter described and claimed.

Figure 1:
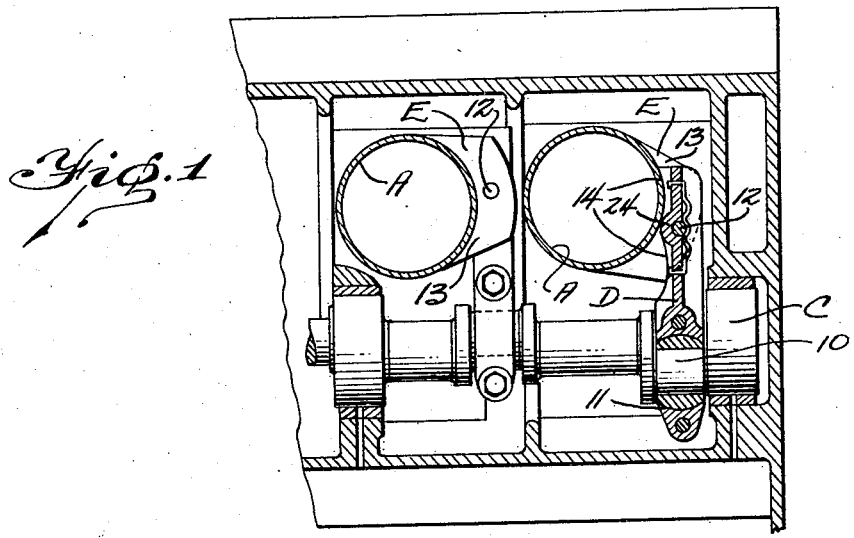
Figure 2:
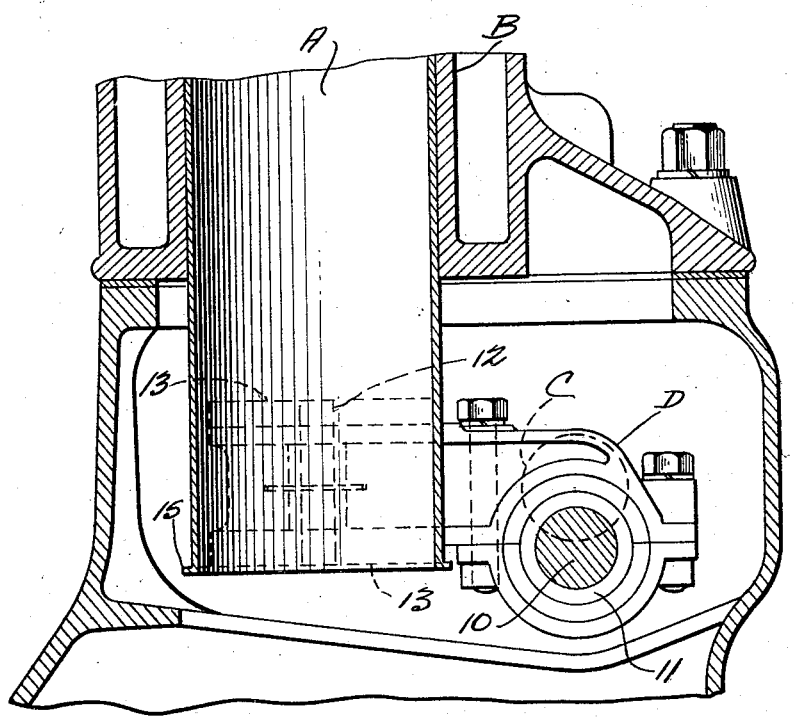

Referring to the accompanying drawings in which like reference characters indicate corresponding parts throughout the several views, Fig. 1 is a plan view in cross section of a portion of an engine showing the sleeve valves and driving means therefor, Fig. 2 is a sectional elevation through a typical sleeve valve, Fig. 3 is a perspective view of the lower end of a sleeve valve showing the sleeve prepared to receive the driving lug, and Fig. 4 is a perspective view showing the driving lug.

In the drawings reference character A represents the sleeve valves operable within cylinders B, the sleeves and cylinders having the usual ports (not shown) for controlling the cyclic events of the engine. The sleeves may be driven in various manners, that shown comprising the valve layshaft C having cranks 10 which may operate the links D through a ball and socket connection 11 to permit the slight side swing of the links. The links D may be constrained to move parallel to themselves by connection through a pivot pin 12 between the ears 13 of sleeve driving lug E and if desired the link face next to the sleeve may be recessed in arcs 14 conforming with the sleeve contour whereby the pivot pin 12 may be positioned closer than otherwise to the sleeve valve. Thus the sleeve valve is moved in a combined reciprocating and oscillating path, the usual piston (not shown) operating within each sleeve valve for each cylinder of the engine.

Referring particularly to Figs. 3, 4, and 5 sleeve A is constructed of relatively thin steel tubing or other suitable material affording the necessary strength and resistance to rupture and distortion. Such tubing may be drawn, rolled or prepared in any convenient manner. I then preferably spin or roll over the lower edge to form the annular flange 15 which will stiffen the lower portion of the sleeve and prevent its twisting and distortion. The rib 16 is pressed outwardly and may be located so as to receive therewithin the side edges 17 and top edge 18 of the driving lug E, the lower edge 19 thereof resting in the corner formed by the flange 15. The lug E is then secured in position preferably by welding at 20 between the rib 16 and lug edges 17 and 18, and also at 21 between the flange 15 and adjacent lug face 22. The rib 16 affords an efficient welding connection with the faces of the lug E it being well known that two materials will best weld when they are parallel, or substantially so, as distinguished from a right angular relative position. For the same reason the flange 15 offers a good welding connection and at the same time the rib 16 and flange 15 stiffens and strengthens the sleeve. The lug E may be cut away at 23 to permit close positioning of the pivot pin 12 to the sleeve valve since otherwise the link pivot pin boss 24 would interfere with the driving lug rear wall requiring the pivot pin to be moved further away from the sleeve. Thus the lug E is formed with the ears 13 connected by bridges 25, aligned openings 26 in the ears receiving the pivot pin 12. The lugs E may be conveniently drop forged or stamped from sheet metal, and where the former method is employed the lugs may be forged in the form of an annular band with annular spaced flanges, and then segmentally cut to form the lugs as shown in Fig. 4.

Since the general practice in engines of the character described is to proportion the parts so that a portion of the piston leaves the lower end of the sleeve valve during a part of its travel, it is advisable to avoid sleeve deflected portions which might allow expansion of the piston rings into such deflected portions and the several illustrated embodiments of my invention will meet such requirements.

Various modifications will suggest themselves without departing from the spirit and scope of my invention and I do not limit myself to the precise constructions illustrated except as recited in the claims.

What I claim as my invention is:

1. A tubular sleeve valve for internal combustion engines formed with an annular reinforcing flanged portion and an integral ribbed portion and a sleeve lug welded to said portions.

2. The combination with a tubular sleeve valve having a peripheral integral stiffening flange and an integral portion bent outwardly from the sleeve, of a sleeve driving lug, and means cooperating with the flange and bent portion for securing the lug to the sleeve.

3. A tubular sleeve valve for internal combustion engines provided with an integral peripheral stiffening flange and an integral rib, and a sleeve driving lug secured adjacent the outer surface of the sleeve in contact with the sleeve flange and rib.

4. The combination with a tubular sleeve valve having an integral peripheral stiffening flange, of a sleeve driving lug formed with a face contacting with the sleeve and a flanged portion adjacent the sleeve flange for welding thereto.

5. A tubular sleeve valve for internal combustion engines formed with an annular reinforcing flange about the lower circumferential edge thereof, and a sleeve lug having a portion overlapping said flange and welded thereto.

6. A tubular sleeve valve for internal combustion engines formed with an annular reinforcing flange portion and an integral ribbed portion, and a sleeve lug having a portion thereof overlapping said sleeve portions and welded thereto.

7. A tubular sleeve valve for internal combustion engines formed with an annular reinforcing flange portion and an integral ribbed portion, and a sleeve lug positioned to project radially outwardly with respect to the wall of the sleeve and having an inner edge portion overlapping said sleeve portions and welded thereto.

8. A tubular sleeve valve for internal combustion engines formed with an outwardly extending annular projecting portion, and a sleeve lug seated against the outer face of the tubular sleeve adjacent the projecting portion and secured thereto by welding the lug to said projecting portion.

9. A tubular sleeve valve for internal combustion engines formed with an outwardly extending annular reinforcing flange about the lower circumferential edge thereof, and a sleeve lug seated against the outer face of the tubular sleeve adjacent the flange and secured thereto by welding the lug to said flange.

10. A tubular sleeve valve for internal combustion engines formed with an outwardly extending annular projecting portion, and a sleeve lug provided with an inner face of a contour permitting the same to seat against the outer face of the sleeve adjacent said projecting portion and secured thereto by permanently attaching the lug to said projecting portion.

11. A tubular sleeve valve for internal combustion engines formed with an outwardly extending annular projecting portion, and a sleeve lug comprising a pair of spaced ears and seated against the outer face of the sleeve and having one of said ears overlapping said projecting portion and welded thereto.

12. A tubular sleeve valve for internal combustion engines formed with a pair of spaced outwardly extending parallel annular projecting portions, and a sleeve lug having a pair of spaced parallel ears and seated against the outer face of the sleeve intermediate the projecting portions, the ears of said lug arranged to have a portion thereof overlapping said projecting portions and welded thereto.

13. A tubular sleeve valve for internal combustion engines formed with an annular reinforcing flanged portion and an integral ribbed portion, and a sleeve lug seated against the outer face of the tubular sleeve adjacent to said portions and welded thereto.

In witness whereof, I hereunto subscribe my name this 20th day of August, A. D. 1928.

ARCHIE MACPHAIL NIVEN.